April 8, 1952     O. J. SEELY     2,592,475
TRAILER STEERING MECHANISM

Filed April 5, 1949     7 Sheets-Sheet 1

OTTY JAMES SEELY,
INVENTOR.

BY *Hazard & Miller*

ATTORNEYS.

OTTY JAMES SEELY,
INVENTOR.

BY *Hazard & Miller*

ATTORNEYS.

April 8, 1952     O. J. SEELY     2,592,475
TRAILER STEERING MECHANISM
Filed April 5, 1949     7 Sheets-Sheet 5
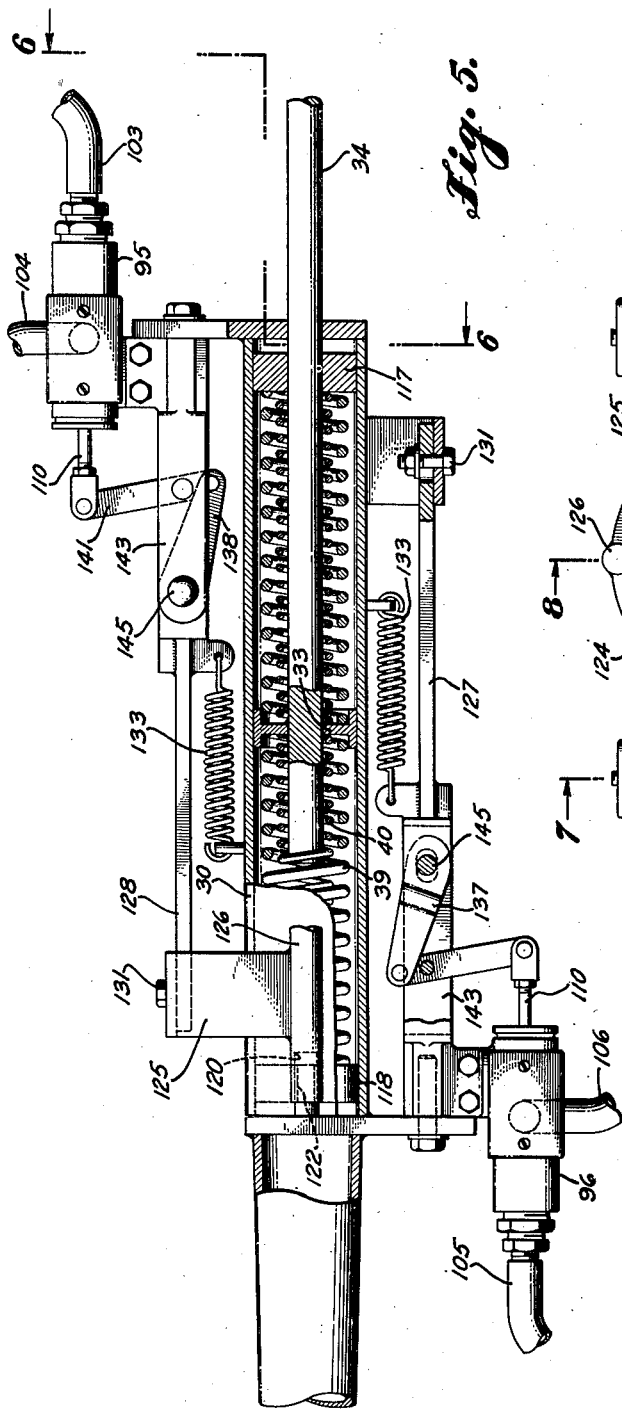
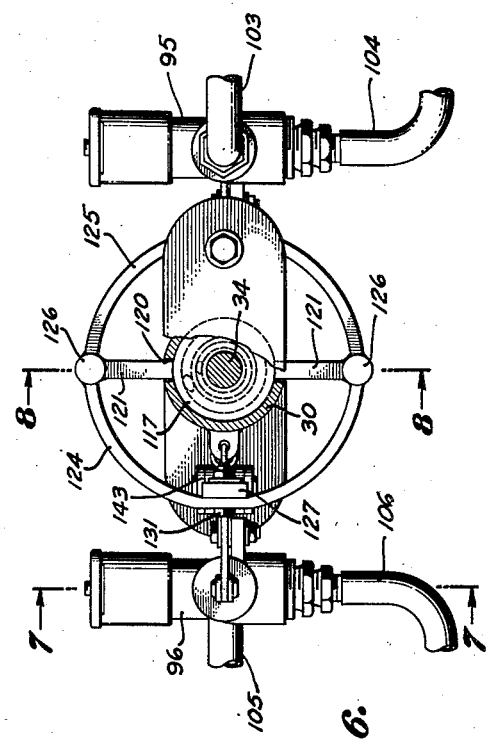
OTTY JAMES SEELY
INVENTOR.
BY *Hazard & Miller*
ATTORNEYS.

April 8, 1952 — O. J. SEELY — 2,592,475
TRAILER STEERING MECHANISM
Filed April 5, 1949 — 7 Sheets-Sheet 6
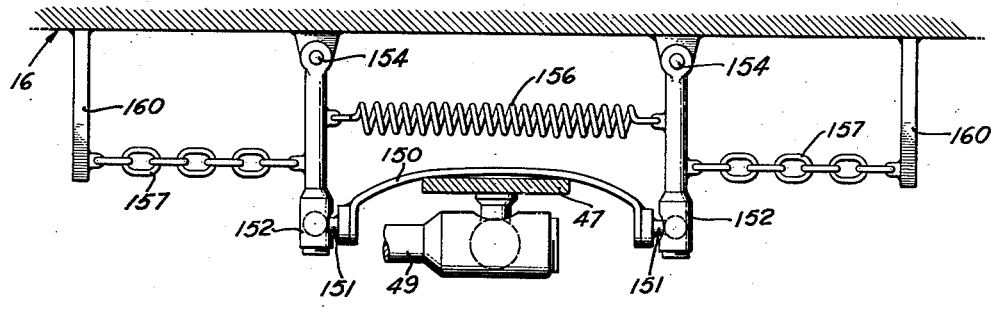
Fig. 11.
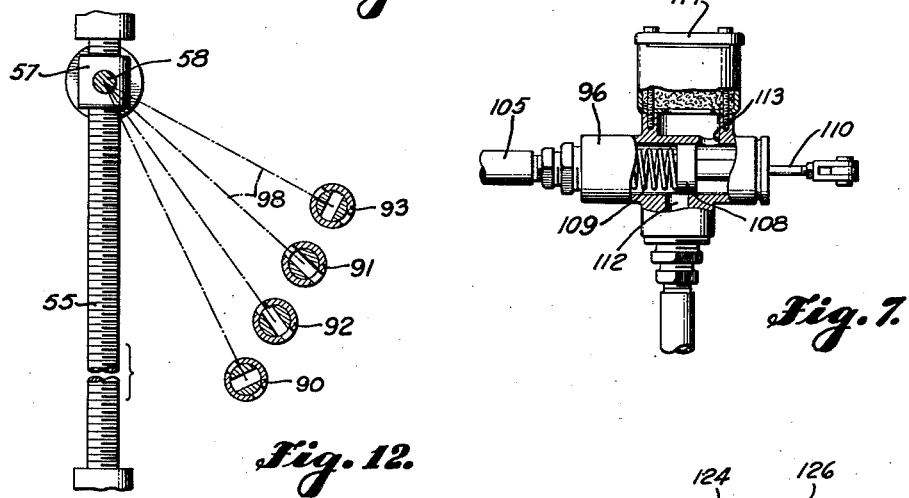
Fig. 7.
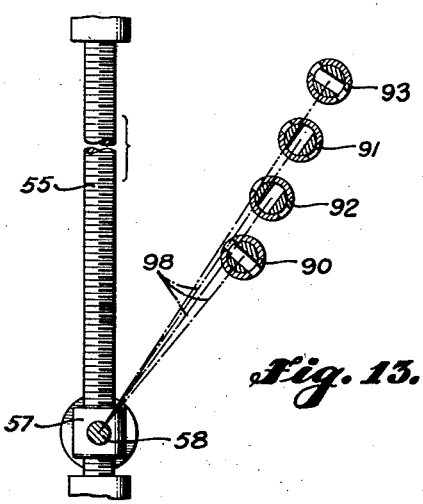
Fig. 12.
Fig. 13.
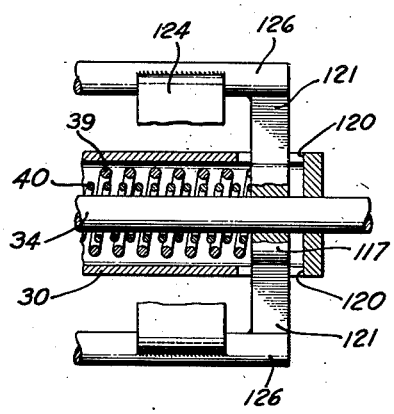
Fig. 8.
OTTY JAMES SEELY,
INVENTOR.
BY Hazard & Miller
ATTORNEYS.

April 8, 1952  O. J. SEELY  2,592,475
TRAILER STEERING MECHANISM
Filed April 5, 1949  7 Sheets-Sheet 7
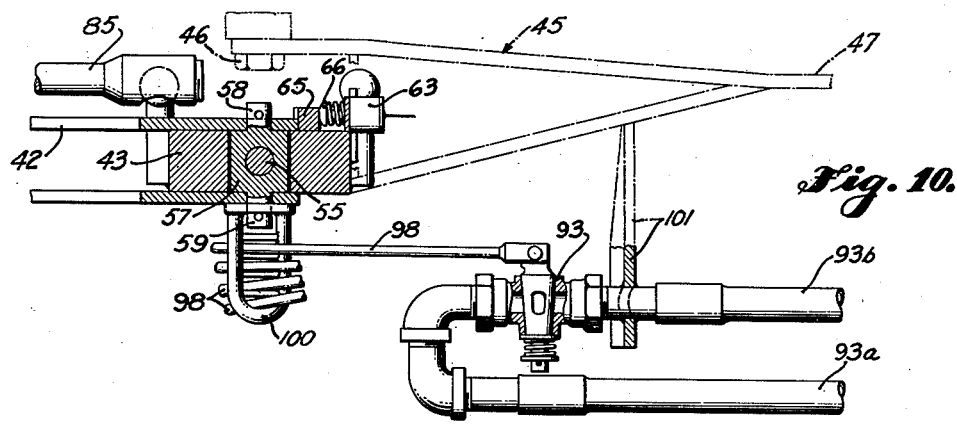
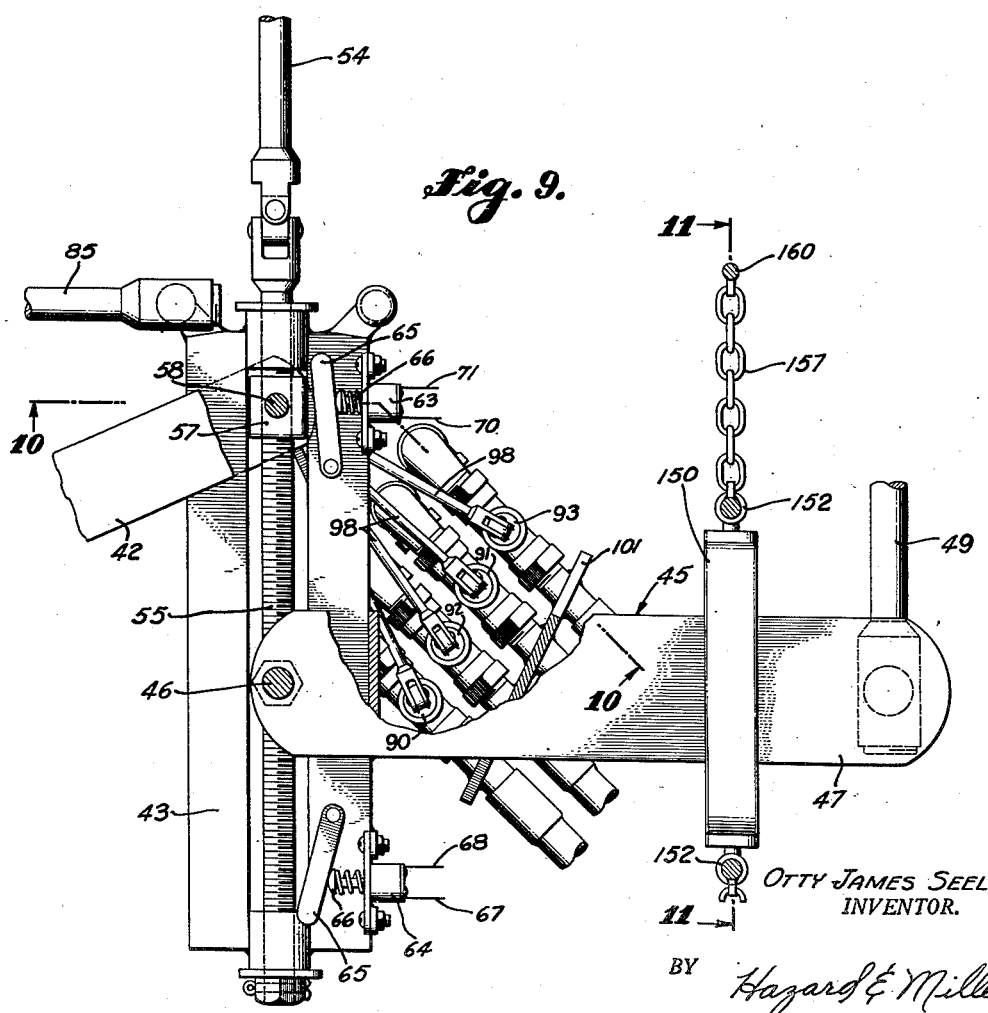
OTTY JAMES SEELY,
INVENTOR.
BY Hazard & Miller
ATTORNEYS.

Patented Apr. 8, 1952

2,592,475

UNITED STATES PATENT OFFICE 2,592,475

TRAILER STEERING MECHANISM

Otty James Seely, Oildale, Calif., assignor of thirty per cent to R. N. Lancaster, Bakersfield, Calif.

Application April 5, 1949, Serial No. 85,507

22 Claims. (Cl. 280—33.55)

This invention relates to an apparatus applicable to a towed vehicle having turnable wheels and a towing vehicle for the purposes of guiding the turnable wheels of the towed vehicle in accordance with the direction of turn of the towing vehicle and direction of movement backward or forward of the vehicles.

The main object of the present invention is to provide an apparatus applicable to a towed vehicle having turnable wheels and a towing vehicle having turnable wheels which apparatus is actuatable when the vehicles are moving forward and backward and the turnable wheels of the towing vehicle are turned to turn the turnable wheels of the towed vehicle in a direction opposite the direction of turn of the turnable wheels of the towing vehicle.

Another object of the present invention is to provide an apparatus applicable to a towed vehicle having turnable wheels and a towing vehicle wherein the apparatus includes means oscillatably mounted on the towed vehicle and connected with the turnable wheels of the towed vehicle so as to turn the turnable wheels when tilted, means connecting the towing vehicle and the oscillatable means and responsive to misalignment of the vehicles for tilting the oscillatable means to turn the turnable wheels and which apparatus includes means for reversing the direction of tilt of the oscillatable means depending on whether the vehicles are moving forward or backward.

Another object of the present invention is to provide an apparatus as described in the above paragraph in which booster means are provided for assisting the turning of the turnable wheels of the towed vehicle.

Another object is to provde a towed vehicle having turnable wheels and a towing vehicle equipped with apparatus as set out in the above paragraphs for turning the turnable wheels of the towed vehicle.

Another object of the present invention is to provide a towed vehicle having turnable wheels and a towing vehicle having turnable wheels, the vehicles being equipped with apparatus actuatable for turning the turnable wheels of the towed vehicle so that they track the turnable wheels of the towing vehicle.

With the foregoing and other objects in view, which will be made manifest in the following detailed description and specifically pointed out in the appended claims, reference is had to the accompanying drawings for an illustrative embodiment of the invention, wherein:

Figure 1 discloses a plan view of the towed vehicle and the towing vehicle equipped with the apparatus in which the vehicles are moving forward and to the right;

Fig. 5 is an enlarged plan view in section through the part of the apparatus located between the towed vehicle and the towing vehicle;

Fig. 6 is a sectional view along lines 6—6 of Fig. 5;

Fig. 7 is a sectional view along lines 7—7 of Fig. 6 with parts broken away;

Fig. 8 is a sectional view along lines 8—8 of Fig. 6;

Fig. 9 is a plan view with parts broken away showing the tilt bar and the lead screw and valves controlled by the screw;

Fig. 10 is a sectional vew along lines 10—10 of Fig. 9;

Fig. 11 is a view along lines 11—11 of Fig. 9;

Fig. 12 is a diagrammatic view showing the positions of the valves controlled by the lead screw; and Fig. 13 is another view showing the valves in another position.

Figure 1:
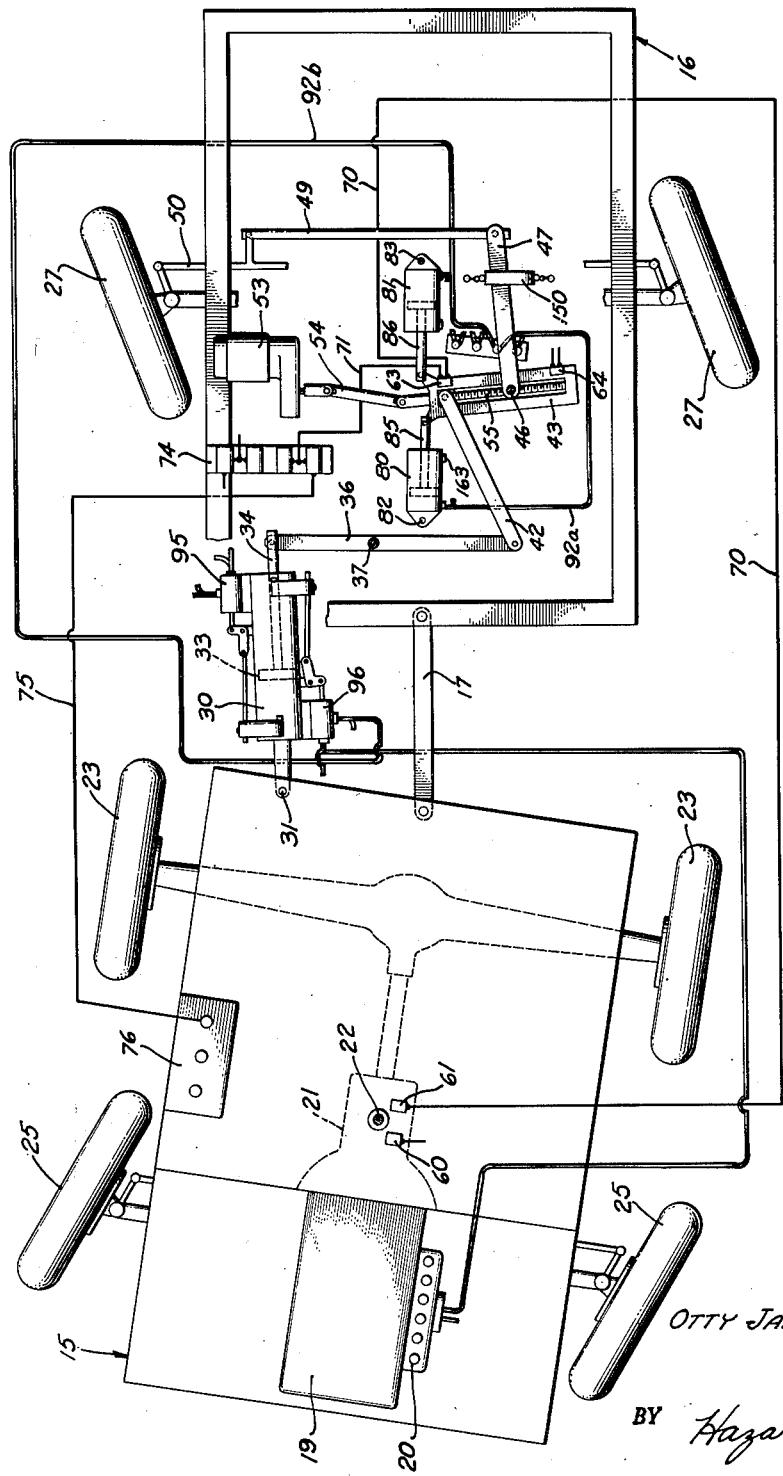

Referring to the accompanying drawings wherein similar reference characters designate similar parts throughout, Fig. 1 shows a towing vehicle generally indicated at 15 and towed vehicle generally indicated at 16, the two vehicles being connected to one another by means of a hitch 17 of any suitable means. The towed vehicle 15 has a motor 19, a manifold 20, a transmission 21 with the gear shift 22 leading thereinto and there is the usual drive from the transmission to rear wheels 23. Although only two rear wheels are shown, it is obvious that more rear wheels could be provided on the towing vehicle without departing from the scope of the invention. The towing vehicle also has turnable wheels 25 so as to permit the towing vehicle to be steered.

The towed vehicle is equipped with turnable wheels 27 which are mounted for turning movement on the towed vehicle and, although only two turnable wheels are shown, the towed vehicle could be equipped with other wheels which would not be turnable and if other wheels were provided the rear wheels of the towed vehicle would be the turnable wheels.

The apparatus for turning the turnable wheels of the towed vehicle includes a control housing 30 which is pivotally mounted at 31 to the towing vehicle, said housing having a piston 33 slidable therewithin, the piston being equipped with a piston rod 34 which is pivoted to a main tilt lever 36, said main tilt lever being pivoted on the towed vehicle at 37. The piston 33 is approximately centered within the control housing 30 by means of compression springs 39 and 40 so that whenever the vehicles are misaligned the control housing or cylinder will move relative to the piston 33, or vice versa, depending upon the way the vehicles are considered, and therefore the springs 39 and 40 are compressed thereby applying force to the main tilt lever 36 to pivot the lever.

The main tilt lever 36 is connected by a lever 42 to stub shaft 58 on a nut 57 which is movable along a lead screw 55 that is rotatably mounted on the tilt bar 43. The tilt bar 43 is pivotally suspended by means of a frame 45 that is pivotally mounted at 46 on the chassis of the towed vehicle. The frame 45 is rigid with the tilt bar 43 so that the tilt bar 43 and frame 45 swing in unison about the pivot bolt 46 which is located above but intermediate the ends of the tilt bar 43.

Figure 4:
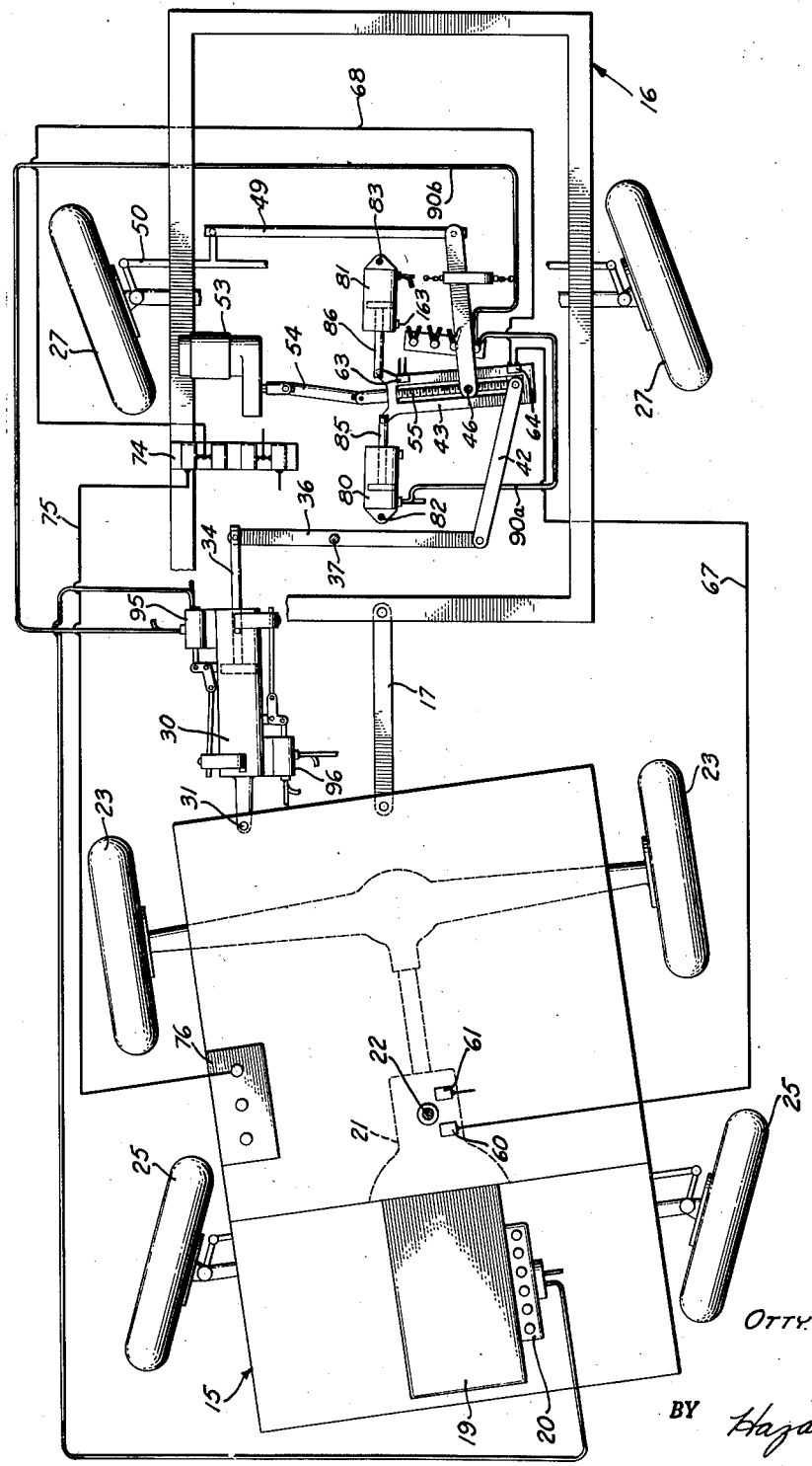
Fig. 4 is a plan view showing the vehicles moving backwardly to the right.

The frame 45 includes a push lever 47 which is rigidly connected to the tilt bar and pivoted to a push rod 49, said push rod 49 being pivotally connected to the steering apparatus 50 for the rear wheels. Therefore, when the lever 42 is located as it is shown in Fig. 1 and the vehicles are misaligned, the main tilt lever 36 will tilt the tilt bar 43 thereby swinging the push lever 47, thereby pushing the push rod 49 and turning the turnable wheels 27 of the towed vehicle. In Fig. 1, the vehicles are shown moving forward and the towing vehicle is turning to the right and therefore the position of the parts shown in Fig. 1 is such that the turnable wheels 27 of the towed vehicle turn in the direction opposite to the direction of turn of the turnable wheels 25 of the towing vehicle, this resulting in the turnable wheels 27 tracking the turnable wheels 25 so that the towed vehicle effectively follows the towing vehicle, which is desired. However, if the vehicles are moving backward it is desired that the turnable wheels 25 and 27 be turned in the same direction as shown in Fig. 1, which is so as can be seen in Fig. 4 wherein the vehicles are shown moving backward and to the right. However, in this case the vehicles are misaligned in the opposite direction from that when the vehicles are moving forward and therefore some means must be provided to reverse a part of the apparatus so that the turnable wheels 27 will be turned in the right direction.

This reversing apparatus comprises a motor 53, which is preferably an electric motor, which motor is connected by means of a double universal joint 54 to a lead screw 55, said lead screw being rotatably mounted within tilt bar 43. The lever 42 is pivoted on a control nut 57 which is best seen in Fig. 10, which control nut rides on lead screw 55, said control nut having an upwardly extending stub shaft 58 on which lever 42 is pivoted, and a downwardly extending stub shaft 59 for purposes to be described. Motor 53 is of the reversing type so that when energized through one set of leads the motor rotates in one direction, and when energized through another set of leads the motor rotates in the opposite direction, this arrangement being so common that no detailed description is thought necessary. This reversing control motor 53, when actuated in the proper manner, runs the control nut 57 from one end of lead screw 55 to the other end of lead screw 55, thereby reversing the direction in which the tilt bar 43 is tilted when moved by lever 42.

With this reversing construction it will be seen by comparing Figs. 1, 2, 3 and 4, that whatever direction the turnable wheels 25 on the towing vehicle are turned when the towing vehicle is moving, the turnable wheels 27 of the towed vehicle will be turned in the opposite direction which will be the correct direction whether the vehicles are moving forward or backward. For instance, by comparing Figs. 2 and 3 it can be seen that the turnable wheels 25 and 27 are turned in the same direction although in Fig. 2 the vehicles are moving forward and in Fig. 3 the vehicles are moving backward. The difference between backward and forward movement of the vehicles is that the vehicles are misaligned in the opposite direction and since the reversing mechanism is adapted to reverse the direction of tilt of the tilt bar 43, the opposite effects of the control housing 30, the piston 33, springs 39 and 40 are taken into account.

In order that the reversing motor 53 will correctly reverse the direction of tilt of the tilt bar 43 when the vehicles change direction from forward to backward, or from backward to forward, a control system including wiring leading from contacts 60 and 61 mounted near the gear shaft 22 to the motor 53 is provided. Means are also provided for stopping movement of the control nut 57 as it reaches the end of the tilt bar 43 and these means comprise switches 63 and 64 which have pivotally mounted levers 65 resting against spring-constrained detents 66 which controls the contacts of switches 63 and 64. When the lower switch 64 is in the position shown in Fig. 9, the circuit through switch 64 is closed so that the motor 53 can be energized through leads 67 and 68 and the motor 53 will remain energized until the control nut 57 moves down, as the device is depicted in Fig. 9, contacts lever 65 of switch 64, and opens the contacts of switch 64, thereby opening the circuit and stopping the motor 53.

Switch 63, as shown in Fig. 9, is in open circuit position so that motor 53 cannot be energized through leads 70 and 71.

Contacts 60 near transmission 21 and gear shift 22 may be termed the rear direction contacts, and contacts 61 the forward direction contacts because when the gear shift 22 is shifted to the left, as the apparatus is depicted in Fig. 1, contacts 60 will be closed and a circuit completed, as best shown in Fig. 4, through leads 67 and 68 through terminal box 74 and motor 53, back through lead 75 to a battery 76 on the towing vehicle 15. If the gear shift 22 is moved to the right as the parts are depicted in Fig. 1, contacts 61 will be closed, thereby closing a circuit through lead 70 to switch 63 through lead 71 to terminal box 74 on the towed vehicle to motor 53 from the motor back to the terminal box and through lead 75 to the battery 76 on the towing vehicle 15.

Booster means are provided for assisting the turning of turnable wheels 27 of the towed vehicle 16 and although a system is to be described which works off the intake manifold of the towing vehicle, the system is not to be limited to a vacuum actuated system but may be a pressure actuated system, or actuated hydraulically or electrically, and the invention is not intended to be limited by the showing of a vacuum-operated system. The booster means include pivotally mounted cylinders 80 and 81 which cylinders are pivotally mounted at 82 and 83 on the towed vehicle 16. Cylinder 80 is equipped with a piston and piston rod 85 and cylinder 81 is equipped with a piston and piston rod 86, piston rods 85 and 86 being pivoted on tilt bar 43 as shown in Fig. 1 and shown in more detail in Figs. 9 and 10, tilt bar 43 having upwardly extending knobs receivable within sockets provided on piston rods 85 and 86. Conduits which will be described in detail are provided to connect the intake manifold 20 to the cylinders 80 and 81, the conduits being connected to several control valve means before they reach the cylinders 80 and 81 so that either cylinder 80 or cylinder 81 is connected to the source of vacuum, that is, the intake manifold, depending upon the direction of turn of the towing vehicle and, also, depending upon whether the vehicles are moving forward or backward.

There are two pairs of stations or valves, 90 and 91 being the first pair, and 92 and 93 being the second pair, and these valves may be also termed control stations since if one of the valves is connected to a source of vacuum and the valve is open, then the booster cylinder 80 or 81 to which it is connected will be connected to a source of vacuum and therefore actuated. The pairs of valves are not connected directly to the source of vacuum, that is, the manifold 20, but are connected to two main control valves 95 and 96 which are mounted on the control housing 30 as can best be seen in Fig. 1. Briefly, then, the supply vacuum is connected first to the main control valves 95 and 96 which are in turn connected to the control stations or valves 90, 91, 92 and 93 which, in turn, are connected to the booster cylinders 80 and 81. Stations or valves 90, 91, 92 and 93 are connected to cylinders 80 and 81 by means of conduits 90a, 91a, 92a and 93a, see Figs. 1, 2, 3 and 4, valves or stations 90 and 92 being connected to cylinder 80 and valves or stations 91 and 93 being connected to cylinder 81.

The plugs for valves 90, 91, 92 and 93 are moved from open to closed position, and vice versa, by means of arms 98 which arms are positioned one above the other, as shown in Fig. 10, and slidable through an oscillatable support 100, said support being oscillatably mounted on downwardly extending stub shaft 59 of control nut 57, see Fig. 10. The arms 98 are therefore controlled by the movement of control nut 57 and therefore open and closed, depending on whether the control nut is at one end or the other end of tilt bar 43. The control valves 90, 91, 92 and 93 are supported from frame 45, as can best be seen in dot-dash lines in Fig. 10, by means of a plate 101, see Figs. 9 and 10.

The pairs of valves 90 and 91, and 92 and 93, are so initially set up and connected by arms 98 to oscillatable support 100 so that one valve of each pair is open and the other valve of each pair is closed when the control nut 57 is at one end of the tilt bar and when the control nut 57 is at the other end of the tilt bar the valves that were open are closed and the valves that were closed are open.

Of the pair of valves 90 and 91, one of the valves is connected by a suitable conduit to booster cylinder 80 and the other valve is connected by a suitable conduit to booster valve 81, as hereinbefore set out, and of the pair of valves 92 and 93, one is connected by a suitable conduit to booster cylinder 80 and the other valve is connected to a suitable conduit to booster cylinder 81, as hereinbefore set out.

The main control valves 95 and 96 located on control housing 30 are connected by conduits 90b, 91b, 92b and 93b to the stations or valves 90, 91, 92 and 93, so that each of the main control valves 95 and 96 is adapted to connect one pair of the control valves or stations 90 and 91 or 92 and 93 to a source of vacuum, that is, the manifold 20 in the particular construction shown.

The arrangement, briefly, is this: Control valves 95 and 96 are connected to a source of vacuum and these main control valves are adapted to be opened and closed, depending upon the direction of misalignment of the vehicles, and each of the main control valves is connected to one pair of the control valves 90, 91, 92 and 93 and of a pair of control valves one is connected to one booster cylinder and the other is connected to the other booster cylinder, and of a pair of the control valves 90, 91, 92 and 93, one is open and the other is closed, depending on whether control nut 57 is at one end of lead screw 55 or the other end of lead screw 55.

Fig. 7 is a sectional view of the main control valve 96 having conduits 105 and 106 connected thereto. Main control valve 95 has conduits 103 and 104 connected thereto. Each of the main control valves 95 and 96 has a piston 108 and there is a compression spring 109 bearing against the piston 108 to urge the piston into open position. Each of the main control valves 95 and 96 also has a piston rod 110 connected thereto, said piston rod being adapted to be reciprocated or moved back and forth depending on the direction of misalignment of the vehicles 15 and 16. In the main control valve 96 shown in Fig. 7, the conduit 105 leads to the source of vacuum and the conduit 106 leads to one pair of the control valves, the passageways 112 being opened and closed by piston 108. The aperture 113 which is provided in each of the main control valves 95 and 96 serves to break the vacuum within the supply conduit 106 whenever the piston 108 is moved to shut off the supply vacuum through 105 so that no vacuum will exist in the supply line 106. A suitable air filter 114 is provided on each of the main control valves 95 and 96 so that no foreign substance can enter into the vacuum supply lines.

Auxiliary pistons 117 and 118 (see Fig. 5) are provided within control housing 30 and these auxiliary pistons are rigidly connected through slots 120 in control housing 30 to arms 121 and 122, respectively, which arms are in turn rigidly connected to semi-circular members 124 and 125, said semi-circular members having fixedly mounted thereon push arms 127 and 128, respectively. The semi-circular members are rigidly connected together by rods 126. Push arms 127 and 128 may be initially adjusted so that main control valves 95 and 96 will be correctly controlled, by means of nuts and bolts 131 which are best shown in Fig. 5, the bolt fitting within a slot provided within push arms 127 and 128. The push arms 127 and 128 are connected by tension springs 133 to control housing 30 shown in Fig. 5 so that the springs serve to put the push arms in a central or neutral position, the springs 39 and 40 urging auxiliary pistons 117 and 118 in one direction and springs 133 urging auxiliary pistons 117 and 118 in the opposite direction so that whenever the auxiliary pistons and push arms are moved from their neutral position they will be urged to return to their neutral position.

Push arms 127 and 128 have levers 137 and 138, respectively, pivoted thereon which levers are in turn pivoted on arms 140 and 141, said last named arms being pivoted on piston rods 110 of the main control valves 95 and 96. The arms 140 and 141 are pivoted on supports 143 which supports are rigidly connected to control housing 30. It will be seen, then, that when push arms 127 and 128 are moved, the pistons 108 within main control valves 95 and 96 will be moved and, therefore, the main control valves 95 and 96 will be open and closed, depending upon the direction and magnitude of the push arms 127 and 128.

Whenever the vehicles 15 and 16 are misaligned the springs 39 and 40 within one end of housing 30 will be compressed thereby forcing the auxiliary cylinder against which it bears to move thereby moving the push arm connected to the auxiliary cylinder, thereby opening one of the main control valves 95 and 96 and serving to close the other main control valve because the auxiliary cylinders are connected together by rods 126. The main control valves 95 and 96 are set up so that when the vehicles are aligned the main control valves are open and, therefore, the conduits leading from the main control valves to the control stations or valves are connected to the supply of vacuum, but when the vehicles are misaligned in one direction, one of the main control valves is opened and the other control valve is closed and when the vehicles are misaligned in the other direction the main control valve that was closed is opened and the main control valve that was open is closed so that, depending on the direction of misalignment, one pair of control stations or valves is connected to a source of vacuum whenever the vehicles are misaligned, and all the control stations connected to a source of vacuum when the vehicles are aligned, one booster means opposing the other booster means to serve to keep the turnable wheels of the towed vehicle 16 aligned.

The levers 137 and 138 are slidably supported on supports 143 by means of pins 145 which fit within levers 137 and 138 and fit within slots provided in support 143, which can best be seen in Fig. 5 in the case of lever 137, the dot-dash lines showing the slot provided in support 143. This construction allows levers 137 and 138 to move arms 140 and 141 while maintaining the ends of the levers closest to push arms 127 and 128 in alignment with the line of travel of push arms 127 and 128.

The operation of the booster means is substantially as follows: In Fig. 1 it can be seen that when the vehicles are misaligned as shown, that is, when the vehicles are moving forwardly and to the right, the main control valve 96 will be open because the springs 39 and 40 within the left hand end of housing 30 will be compressed, thereby pushing auxiliary piston 118 to the left as the piston is shown in Fig. 5, and since the auxiliary pistons 117 and 118 are connected to one another by means of rods 126, auxiliary piston 117 will be moved toward the left and therefore push arm 127 will be moved toward the left, moving lever 137 to the left, pulling piston rod 110 of main control valve 96 to the right, thereby moving piston 108 of main control valve 96 to the right, thereby connecting conduits 105 and 106, see Figs. 5 and 7. Main control valve 96 being connected to one pair of control stations or valves 92 and 93 and control station or valve 92 being connected to booster cylinder 80, will connect booster cylinder 80 to the intake manifold thereby drawing piston rod 85 to the left, as the device is depicted in Fig. 1, thereby assisting in tilting turnable wheels 27 as shown in Fig. 1.

While the booster means is performing the above operations the springs 39 and 40 within the left hand end of housing 30 are urging piston 33 to remain in its central position, as the parts are depicted in Fig. 1, pivoting the main tilt lever 36 so as to tilt tilt bar 43 in a counter-clockwise direction, as the tilt bar is depicted in Fig. 1, so that the main tilt lever and the booster means together turn the turnable wheels 27.

When describing the main control valves 95 and 96 conduit 106, in the case of main control valve 96, was said to lead to one pair of control valves or stations and, in the case of main control valve 95, conduit 104 would lead to one pair of the control valves or stations. Also, conduits 90b, 91b, 92b and 93b were said to lead from main control valves 95 and 96 to control valves or stations 90, 91, 92 and 93. Actually it is not particularly important how the main control valves 95 and 96 are connected to control valves or stations 90, 91, 92 and 93. It may be that in some cases it is desirable for one conduit, say conduit 106, to lead from main control valve 96 all the way back to its pair of control valves or stations 92 and 93 where the conduit can be bifurcated into conduits 92b and 93b. On the other hand, it may be desirable to have conduit 106 bifurcated soon after it leaves main control valve 96 so that conduits 92b and 93b are provided adjacent main control valve 96 and lead all the way back to control valves or stations 92 and 93. In any event, conduit 106 at some point branches off into conduits 92b and 93b and conduit 104 for main control valve 95 branches off into conduits 90b and 91b.

Figure 2:
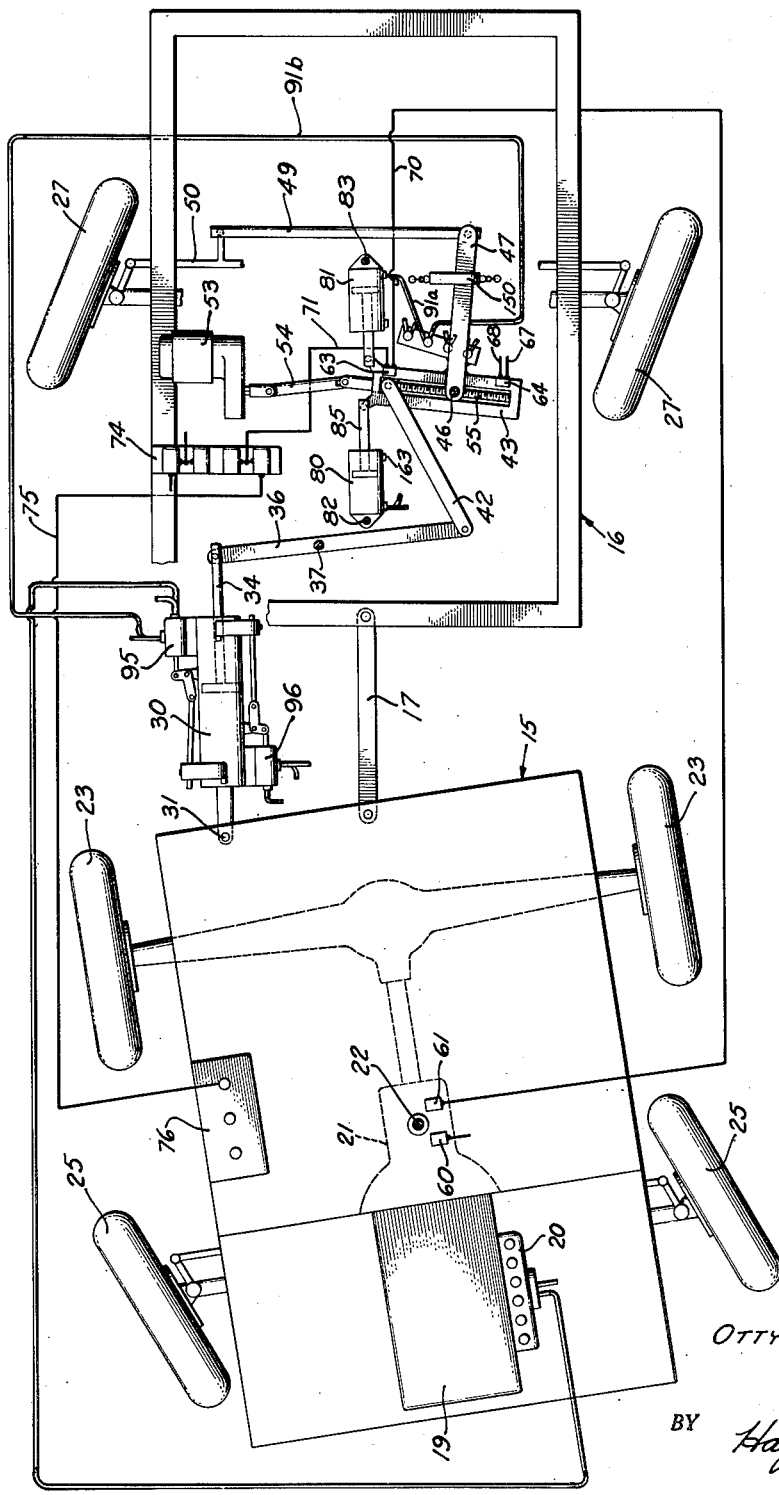
Fig. 2 is a plan view showing the vehicles moving forward and to the left.

If the vehicles are moving forward and the towing vehicle 15 moves to the left, the arrangement of the parts will be as shown in Fig. 2 and since the vehicles are still moving forward, as they were in Fig. 1, the control nut 57 will still be at the upper end of the tilt bar 43 as the device is depicted in Fig. 2, and so upon misalignment of the vehicles which will be in the opposite direction from that depicted in Fig. 1, the turnable wheels 27 of the towed vehicle 16 will be turned in the opposite direction. Upon this misalignment of the vehicles 15 and 16 in the opposite direction the reverse action on valves 95 and 96 is effected, namely, that main control valve 95 is opened and main control valve 96 is closed. Since main control valve 95 is connected by conduits 104, 90b and 91b to control stations or valves 90 and 91, whichever of these control valves or stations is open the booster cylinder connected thereto will be connected to a source of vacuum. As can be seen from Fig. 12 wherein the control nut 57 is at the upper end of the lead screw, control valve or station 91 is open and since this control valve or station is connected to booster cylinder 81, booster cylinder 81 will be connected to the source of vacuum and therefore the piston rod 86 will be moved toward the right of the drawing as the device is depicted in Fig. 2.

Figure 3:
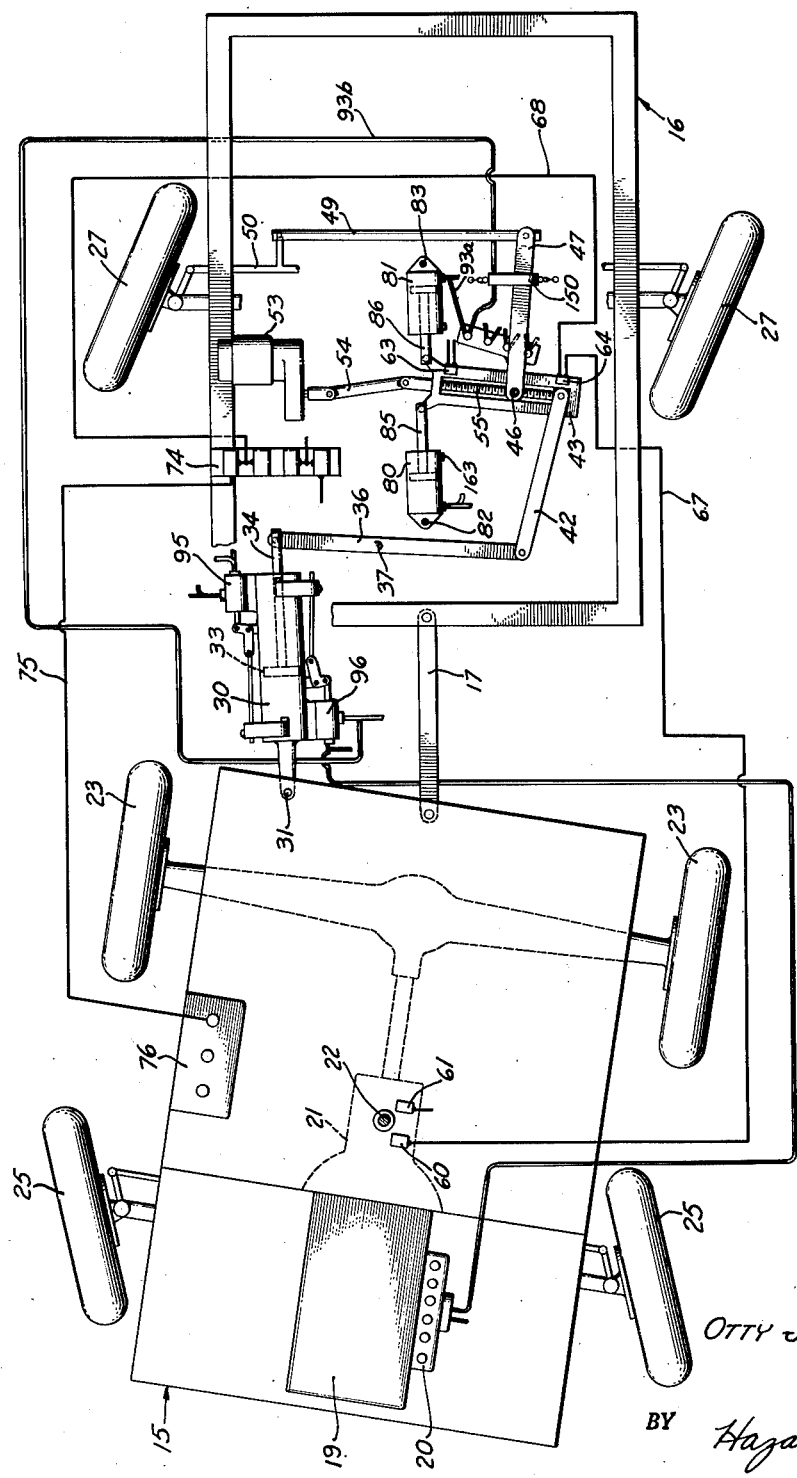
Fig. 3 is a plan view of the vehicles moving backward and to the left.

When the vehicles are moving backward and to the left, the parts will be in the position shown in Fig. 3. At the time that the gear shift 22 on the towing vehicle 15 is thrown into reverse, that is, so as to contact contacts 60, the electric motor 53 will be energized so as to cause the control nut 57 to move to the opposite end of the tilt bar 43 from the position shown in Fig. 2, to the position shown in Fig. 3. Therefore, the vehicles in Fig. 3 will be misaligned in the same direction as shown in Fig. 1, but because the control nut has been reversed the turnable wheels 27 of the towed vehicle 16 will be turned in the opposite direction from that disclosed in Fig. 1 which is the desired direction since they will, in effect, track the turnable wheels 25 of the towing vehicle. It will be appreciated that actually it would seem, in Fig. 3, since the vehicle is moving backward, that the turnable wheels 25 on the towing vehicle 15 are tracking the turnable wheels 27 on the towed vehicle, but since it is the turnable wheels, 25, or, more correctly, the misalignment of the vehicles which results in the turning of the turnable wheels 27, it is not deemed improper to say that the turnable wheels 27 are tracking the turnable wheels 25.

In Fig. 3, the main control valve 96 will be open connecting control station or valve 93 to a source of vacuum and since control station 93 will be open as can be seen in Fig. 3, and since control station or valve 93 is connected to booster cylinder 81, the piston rod 86 of booster cylinder 81 will be drawn toward the right, as the parts are depicted in Fig. 3, thereby assisting in turning the turnable wheels 27.

When the vehicles are moving backward to the right the parts will be in the position shown in Fig. 4, in which the main tilt lever 36 will function in the reverse manner as it functioned in Fig. 3, thereby turning the turnable wheels 27 in the reverse direction from that depicted in Fig. 3. The main control valve 95 will be open and since it is connected to control station or valve 99 which, in turn, is connected to booster cylinder 80, booster cylinder 80 will be connected to a source of vacuum, and therefore piston rod 85 will be drawn toward the left tilting tilt bar 43 and assisting the main tilt lever 36 in turning the turnable wheels 27 on the towed vehicle.

In Figs. 1, 2, 3 and 4, the push arms 127 and 128 are shown in some instances in slanted position. They are shown this way to indicate that the slanted push arm is the one which is pushing whereas the unslanted push arm is the one doing the pulling. Actually there is no slanting or deflection of the push arms 127 and 128 since they are rigidly connected to the semi-circular members 124 and 125.

Means are provided on the towing vehicle 16 to bring the tilt bar 43 back to a neutral position and these means are best shown in Figs. 1, 9 and 11, and these means comprise a spring-strip member 150 which has knobs 151 on the ends thereof fitting within sockets 152, said sockets being pivoted at 154 to the towed vehicle 16. A tension spring 156 is connected to both of the socket members so as to urge the socket members toward one another. Chains 157 connect socket members 152 and standards 160 and prevent the socket members 152 from moving any further in toward each other than they are shown in Fig. 11. However, one of the socket members may move toward its standard against the resistance of tension spring 156.

The operation of this centering means is as follows: The push lever 47, as shown in Figs. 9 and 11, is moved when the tilt bar 43 is tilted and will slide along spring-strip member 150 somewhat deforming the spring-strip member and the socket member 152 will be moved toward its standard against the resistance of tension spring 156 and also against the resistance of strip member 150, and when the force on the tilt bar 43 is released the spring-strip member and the tension spring 156 will serve to strongly urge the push lever 47 back to its central position so that the turnable wheels 27 on the towed vehicle will be automatically aligned by this centering means.

It is desired that when the vehicles are moving backward the apparatus for turning the turnable wheels 27 on the towed vehicle be more sensitive in turning the turnable wheels 27 than when the vehicles are moving forward, and this is accomplished by pivoting tilt bar 43 somewhat off center, this being most obvious from Fig. 9 wherein it can be seen that the pivot 46 is definitely off center from the opposite ends of the lead screw. Also see Fig. 3 where the control nut is at the lower end of the lead screw as the device is depicted there and wherein the off center pivoting of the tilt bar is obvious. It will be appreciated, then, that when the control nut is in the position shown in Fig. 1 there will be a longer leverage between the lever 42 and the pivot 46 of the tilt bar than when the control nut 57 is in the position shown in Fig. 3 and, therefore, with the longer the lever the less sensitive for the same amount of movement will be the turnable wheels 27 and therefore the apparatus is more sensitive when the vehicle is moving backward than forward.

Each of the booster cylinders 80 and 81 has passageways 163 leading to the atmosphere on the sides of the pistons opposite the conduit entrance side of the piston so that when air is within either of the conduits leading from the main control valves 95 and 96, the piston within the booster cylinder which is connected to the conduit which has air therein will be in a balanced position.

The booster means 80 and 81 will aid the centering means in centering the turnable wheels of the towed vehicle 16 when the vehicles are aligned as before explained since both main control valves 95 and 96 will be open and therefore, one booster cylinder will be opposing the other booster cylinder, and since they will pull an equal amount there will be a balanced condition.

Although the cylinder 30 is shown mounted on the towing vehicle and the piston connected to means which are swingably mounted on the towed vehicle, it is obvious that the cylinder could be mounted on the towed vehicle and the piston connected to the towing vehicle, this being a mere reversal of the parts and in such case the cylinder would, of course, be connected to the main tilt lever.

Various changes may be made in the details of construction without departing from the spirit and scope of the invention as defined by the appended claims.

I claim:

1. In combination with a towing vehicle having turnable wheels and a towed vehicle having turnable wheels, means responsive to misalignment of the vehicles for turning the turnable wheels of the towed vehicle in the direction opposite to the direction in which the turnable wheels of the towing vehicle are turned, the turnable wheels of the towing vehicle causing misalignment of the vehicles when turned while the vehicles are moving, control means providing two pairs of energy-transmitting stations, means assisting the first-named means in turning the turnable wheels of the towed vehicle for urging the turnable wheels of the towed vehicle in one direction when receiving energy from either of two of the stations and for urging the turnable wheels of the towed vehicle in the other direction when receiving energy from either of the remaining two stations, said two of the stations consisting of one station from each of the pairs of stations, means connecting the assisting means and the stations to transmit energy to the assisting means whenever the station is effective to transmit energy and is provided with energy, means operable at the time the vehicles move forward for causing one station of each pair to become ineffective to transmit energy and the other station of each pair to be effective to transmit energy and when the vehicles move backward for causing the stations that were ineffective to become effective and the stations that were effective to become ineffective, and means operable when the towing vehicle turns in one direction for providing energy to said one pair of stations and when the towing vehicle turns in the other direction for providing energy to said other pair of stations.

2. In combination with a towing vehicle and a towed vehicle having turnable wheels means swingable mounted on the towed vehicle and connected to the turnable wheels so as to turn the turnable wheels when swung, means connecting the vehicles responsive to misalignment of the vehicles for urging the first-named means to swing in one direction when the vehicles are misaligned one way and to swing in the other direction when the vehicles are misaligned the opposite way, means for reversing the direction in which the second named means causes the first-named means to swing when the vehicles reverse direction of movement from forward to backward or vice versa, control means providing two pairs of energy-transmitting stations, means assisting the first-named means in turning the turnable wheels of the towed vehicle for urging the turnable wheels in one direction when receiving energy from either of two of the stations and for urging the turnable wheels in the other direction when receiving energy from either of the remaining two stations, said two of the stations consisting of one station from each of the pair of stations, and means connecting the assisting means and the stations to transmit energy to the assisting means whenever a station is effective to transmit energy and is provided with energy, the third-named means being operable at the time the vehicle is moved forward for causing one station of each pair to become ineffective to transmit energy and the other station of each pair to become effective to transmit energy and when the vehicle is moved backward for causing the stations that were ineffective to become effective and the stations that were effective to become ineffective, he second-named means being operable when the towing vehicle turns in one direction for providing energy to said one pair of stations and when the towing vehicle turns in the other direction for providing energy to said other pair of stations.

3. In combination with a towed vehicle having turnable wheels and a towing vehicle, means oscillatably mounted on the towed vehicle and connected to the turnable wheels to turn the turnable wheels when tilted, means connecting the first-named means and the towing vehicle responsive to misalignment of the vehicles for urging the first-named means to tilt in one direction when the vehicles are misaligned in one way and to tilt in the other direction when the vehicles are misaligned the opposite way, means for reversing the direction in which the second-named means causes the first-named means to tilt when the vehicles reverse direction of movement from forward to backward or vice versa, booster means for assisting turning of the turnable wheels, means providing conduits between a source of vacuum and the booster means, the booster means being actuatable when connected to the source of vacuum, control means providing two pairs of valves in the conduits between the source of vacuum and the booster means, the booster means urging the turnable wheels in one direction when connected to the source of vacuum through two of the valves and for urging the turnable wheels in the other direction when connected to the source of vacuum through the remaining two valves, said two of the valves consisting of one valve from each of the pair of valves, the third-named means being operable at the time the vehicles move forward for causing one valve of each pair to close and the other valve of each pair to open and when the vehicles move backward for causing the valves that were open to close and the valves that were closed to open, means associated with the conduits between the source of vacuum and the pair of valves to open and close these conduits, the second-named means controlling the last-named means so that when the towing vehicle turns in one direction the conduit to one pair of valves is open and the conduit to the other pair closed and when the towing vehicle turns in the other direction the conduit to the other pair of valves and the conduit to said one pair of valves is closed.

4. In combination with a towed vehicle having turnable wheels and a towing vehicle, means oscillatably mounted on the towed vehicle and connected to the turnable wheels actuatable to turn the turnable wheels when tilted, means connecting the first-named means and the towing vehicle responsive to misalignment of the vehicles for urging the first-named means to tilt in one direction when the vehicles are misaligned one way and to tilt in the other direcion when the vehicles are misaligned the opposite way, means for reversing the direction in which the second-named means causes the first-named means to tilt when the vehicles reverse direction of movement from forward to backward or vice versa, control means providing two pairs of valves, means connecting one pair of valves to a source of vacuum, the last-named means being adapted to be opened and closed to cut off the valves from the source of vacuum or connect the valves to the source of vacuum, means connecting the other pair of valves to a source of vacuum, the last-named means adapted to be opened and closed to cut off said other pair of valves from the source of vacuum or connect said other pair of valves to the source of vacuum, booster means for assisting the first-named means in turning the turnable wheels for urging the turnable wheels in one direction when connected to a source of vacuum through either of two of the valves and for urging the turnable wheels in the other direction when connected to a source of vacuum through either of the remaining two valves, said two of the valves consisting of one valve from each of the pair of valves, and means providing separate connections between the valves and the booster means so that when any of the valves are open and connected to a source of vacuum, the booster means will be connected to a source of vacuum, the third-named means being operable at the time the vehicles move forward for causing one valve of each pair to open and the other valve of each pair to close, and when the vehicles move backward for causing the valves that were closed to open and the valves that were open to close, the second named means being operable to close the fifth-named means and open the sixth-named means when the towing vehicle moves one way and to open the fifth-named means and close the sixth-named means when the towing vehicle moves the other way and to open both the fifth and sixth-named means when the vehicles are aligned.

5. An apparatus adapted to be applied to a towed vehicle having turnable wheels and a towing vehicle for causing the turnable wheels to turn when the vehicles are misaligned, comprising means adapted to be oscillatably mounted on the towed vehicle and connected to the turnable wheels to turn the turnable wheels when tilted, means connected to the first-named means and adapted to be connected to the towing vehicle responsive to misalignment of the vehicle for causing the first-named means to tilt in one direction when the vehicles are misaligned one way and to tilt in the other direction when the vehicles are misaligned the opposite way, means for reversing the direction in which the second-named means causes the first-named means to tilt when the vehicles reverse direction of movement from forward to backward or vice versa, booster means for assisting turning of the turnable wheels, means providing conduits between a source of vacuum and the booster means, the booster means being actuatable when connected to the source of vacuum, control means providing two pairs of valves in the conduits between the source of vacuum and the booster means, the booster means urging the turnable wheels in one direction when connected to the source of vacuum through two of the valves and for urging the turnable wheels in the opposite direction when connected to the source of vacuum through the remaining two valves, said two of the valves consisting of one valve for each of the pair of valves, the third-named means being operable at the time the vehicles move forward for causing one valve of each pair to close and the other valve of each pair to open and when the vehicles move backward for causing the valves that were open to close and the valves that were closed to open, and means associated with the conduits between the source of vacuum and the pairs of valves to open and close these conduits, the second-named means controlling the last-named means so that when the towing vehicle turns in one direction the conduit to one pair of valves is open and the conduit to the other pair of valves is closed and when the towing vehicle turns in the other direction the conduit to said other pair of valves is open and the conduit to said one pair of valves is closed.

6. In combination with a towed vehicle having turnable wheels and a towing vehicle, means on the towing vehicle providing a cylinder mounted off center of the towing vehicle, means on the towed vehicle providing a piston slidable within the cylinder, means connecting the piston and the turnable wheels for urging the turnable wheels to turn when the piston moves relative to the towed vehicle, spring means within the cylinder arranged to act on the piston for urging the piston to remain in a predetermined position relative to the cylinder, the spring means being stressed when the vehicles are misaligned, at least one auxiliary piston within the cylinder and movable when the spring means is stressed, booster means connected to the third-named means to aid the third-named means in turning the turnable wheels, means for connecting the booster means to a supply of vacuum to actuate the booster means, means controlled by the auxiliary piston for opening and closing the connection from the source of vacuum to the booster means, means between the last-named means and the booster means for opening and closing the connection between the source of vacuum and the booster means, and means for reversing the direction in which the third-named means urges the turnable wheels to turn whenever the vehicles reverse movement from forward to backward or backward to forward, the reversing means acting to control the means between said last-named means and the booster means so that the booster means is actuated to always aid the third-named means in turning the turnable wheels.

7. In combination with a towed vehicle having turnable wheels and a towing vehicle, means on one of the vehicles providing a cylinder mounted on said one of the vehicles off center thereof, means on the other vehicle providing a piston slidable within the cylinder, means connecting the means on the towed vehicle and the turnable wheels for urging the turnable wheels to turn when said means on the towed vehicle moves relative to the towed vehicle, means urging the turnable wheels to remain in aligned position, the piston and the cylinder being urged by the fourth-named means to move relative to one another when the vehicles are misaligned, spring means operatively associated with the cylinder and the piston urging the piston to remain in a predetermined position relative to the cylinder so that when the vehicles are misaligned the spring means urges the turnable wheels to turn against the resistance of the fourth-named means, and means for reversing the direction in which the third-named means urges the turnable wheels to turn whenever the vehicles reverse movement from forward to backward or backward to forward.

8. An apparatus adapted to be applied to a towed vehicle having turnable wheels and a towing vehicle for causing the turnable wheels to turn when the vehicles are misaligned, comprising means adapted to be mounted on the towing vehicle providing a cylinder whose axis is off center of the axis of the towing vehicle, means adapted to be mounted on the towed vehicle providing a piston slidable within the cylinder, means connected to the piston and adapted to be connected to the turnable wheels for urging the turnable wheels to turn when the piston moves relative to the towed vehicle, means adapted to be connected to the turnable wheels to urge the turnable wheels to remain in aligned position, the piston being urged by the fourth-named means to move relatively to the cylinder and remain in a fixed position relative to the towed vehicle when the vehicles are misaligned, spring means operatively associated with the cylinder and the piston urging the piston to remain in a predetermined position relative to the cylinder so that when the vehicles are misaligned the spring means urges the turnable wheels to turn against the resistance of the fourth-named means, and means for reversing the direction in which the third-named means urges the turnable wheels to turn whenever the vehicles reverse movement from forward to backward or backward to forward.

9. In combination with a towing vehicle and a towed vehicle having steerable wheels, a lead screw supported by the towed vehicle for bodily pivotal movement about a point intermediate the ends of the lead screw and for axial rotation, the lead screw being connected to the steering wheels of the towed vehicle for turning the steering wheels of the towed vehicle when the lead screw is bodily turned, a nut on the lead screw adapted on axial rotation of the lead screw to be moved from one side of the pivot point of the lead screw to the other, means connected to the nut and operable by misalignment of the vehicles to urge lead screw to bodily turn, means operable by shifting of the vehicles from forward to reverse or vice versa for causing a changeover of the nut from one side of the pivot point of the lead screw to the other, and booster means operatively connected to the lead screw for urging the lead screw to bodily turn and being operatively connected to the first-named means and the nut to be controlled thereby so that the booster means operates to always urge the lead screw to bodily turn in the same direction which the first-named means urges the lead screw to bodily turn.

10. In combination with a towing vehicle and a towed vehicle having steerable wheels, a lead screw supported by the towed vehicle for bodily pivotal movement about a point intermediate the ends of the lead screw and for axial rotation, the lead screw being connected to the steering wheels of the towed vehicle for turning the steering wheels of the towed vehicle when the lead screw is bodily turned, a nut on the lead screw adapted on axial rotation of the lead screw to be moved from one side of the pivot point of the lead screw to the other, means connected to the nut and operable by misalignment of the vehicles to urge lead screw to bodily turn, and means for causing a changeover of the nut from one side of the pivot point of the lead screw to the other.

11. In combination with a towing vehicle and a towed vehicle having steerable wheels, a lead screw supported by the towed vehicle for bodily pivotal movement about a point intermediate the ends of the lead screw and for axial rotation, the lead screw being connected to the steering wheels of the towed vehicle for turning the steering wheels of the towed vehicle when the lead screw is bodily turned, a nut on the lead screw adapted on axial rotation of the lead screw to be moved from one side of the pivot point of the lead screw to the other, means connected to the nut and operable by misalignment of the vehicles to urge lead screw to bodily turn, and means operable by shifting of the vehicles from forward to reverse or vice versa for causing a changeover of the nut from one side of the pivot point of the lead screw to the other.

12. In combination with a towing vehicle and a towed vehicle having steerable wheels, a lead screw supported by the towed vehicle for bodily pivotal movement about a point intermediate the ends of the lead screw and for axial rotation, the lead screw being connected to the steering wheels of the towed vehicle for turning the steering wheels of the towed vehicle when the lead screw is bodily turned, a nut on the lead screw adapted on axial rotation of the lead screw to be moved from one side of the pivot point of the lead screw to the other, means connected to the nut and operable by misalignment of the vehicles to urge lead screw to bodily turn, means for causing a changeover of the nut from one side of the pivot point of the lead screw to the other, and booster means operatively connected to the lead screw for urging the lead screw to bodily turn in the same direction which the first-named means urges the lead screw to bodily turn.

13. In combination with a towing vehicle and a towed vehicle having steerable wheels, a lead screw supported by the towed vehicle for bodily pivotal movement about a point intermediate the ends of the lead screw and for axial rotation, the lead screw being connected to the steering wheels of the towed vehicle for turning the steering wheels of the towed vehicle when the lead screw is bodily turned, a nut on the lead screw adapted on axial rotation of the lead screw to be moved from one side of the pivot point of the lead screw to the other, means connected to the nut and operable by misalignment of the vehicles to urge lead screw to bodily turn, means for causing a changeover of the nut from one side of the pivot point of the lead screw to the other, and booster means operatively connected to the lead screw for urging the lead screw to bodily turn and being operatively connected to the first-named means and the nut to be controlled thereby so that the booster means operates to always urge the lead screw to bodily turn in the same direction which the first-named means urges the lead screw to turn.

14. In combination with a towing vehicle and a towed vehicle having steerable wheels, a tilt bar supported by the towed vehicle for bodily pivotal movement about a point intermediate the ends of the tilt bar and being connected to the steering wheels of the towed vehicle for turning the steering wheels of the towed vehicle when the tilt bar is tilted, means connected to the tilt bar and operable by misalignment of the vehicles for urging the tilt bar to bodily turn, said means being movable with respect to the tilt bar from one side of the tilt bar to the other side to cross over the pivot point thereof, means operable by shifting of the vehicles from forward to reverse or vice versa for causing a changeover of the first-named means from one side of the tilt bar to the other, and booster means operatively connected to the tilt bar for urging the tilt bar to bodily turn and being operatively connected to the first-named means and to the changeover-causing means to be controlled so that the booster means operates to always urge the tilt bar to bodily turn in the same direction in which the first-named means urges the tilt bar to bodily turn.

15. In combination with a towing vehicle and a towed vehicle having steerable wheels, a tilt bar supported by the towed vehicle for bodily pivotal movement about a point intermediate the ends of the tilt bar and being connected to the steering wheels of the towed vehicle for turning the steering wheels of the towed vehicle when the tilt bar is tilted, means connected to the tilt bar and operable by misalignment of the vehicles for urging the tilt bar to bodily turn, said means being movable with respect to the tilt bar from one side of the tilt bar to the other side to cross over the pivot point thereof, and means operable by shifting of the vehicles from forward to reverse or vice versa for causing a changeover of the first-named means from one side of the tilt bar to the other.

16. In combination with a towing vehicle and a towed vehicle having steerable wheels, a tilt bar supported by the towed vehicle for bodily pivotal movement about a point intermediate the ends of the tilt bar and being connected to the steering wheels of the towed vehicle for turning the steering wheels of the towed vehicle when the tilt bar is tilted, means connected to the tilt bar and operable by misalignment of the vehicles for urging the tilt bar to bodily turn, said means being movable with respect to the tilt bar from one side of the tilt bar to the other side to cross over the pivot point thereof, means for causing a changeover of the first-named means from one side of the tilt bar to the other, and booster means operatively connected to the tilt bar for urging the tilt bar to bodily turn in the same direction in which the first-named means urges the tilt bar to bodily turn.

17. In combination with a towing vehicle and a towed vehicle having steerable wheels, a tilt bar supported by the towed vehicle for bodily pivotal movement about a point intermediate the ends of the tilt bar and being connected to the steering wheels of the towed vehicle for turning the steering wheels of the towed vehicle when the tilt bar is tilted, means connected to the tilt bar and operable by misalignment of the vehicles for urging the tilt bar to bodily turn, said means being movable with respect to the tilt bar from one side of the tilt bar to the other side to cross over the pivot point thereof, means for causing a changeover of the first-named means from one side of the tilt bar to the other, and booster means operatively connected to the tilt bar for urging the tilt bar to bodily turn and being operatively connected to the first-named means and to the changeover-causing means to be controlled thereby so that the booster means operates to always urge the tilt bar to bodily turn in the same direction in which the first-named means urges the tilt bar to bodily turn.

18. In combination with a towing vehicle and a towed vehicle having steerable wheels, a tilt bar supported by the towed vehicle for bodily pivotal movement about a point intermediate the ends of the tilt bar and being connected to the steering wheels of the towed vehicle for turning the steering wheels of the towed vehicle when the tilt bar is tilted, means including a swingably mounted tilt bar actuating member operatively connected to the tilt bar operable by misalignment of the vehicles for urging the tilt bar to bodily turn, said tilt bar actuating member being swingable from one position where it is connected to the tilt bar adjacent one end of the tilt bar to another position wherein it is connected to the tilt bar adjacent the other end of the tilt bar, means operable by shifting of the vehicles from forward to reverse or vice versa for causing a changeover of the tilt bar actuating member from one end of the tilt bar to the other, and booster means operatively connected to the tilt bar for urging the tilt bar to bodily turn and being operatively connected to the first-named means and the second-named means to be controlled thereby so that the booster means operates to always urge the tilt bar to bodily turn in the same direction which the first-named means urges the tilt bar to bodily turn.

19. An apparatus of the class described, a towing vehicle having steerable wheels and a towed vehicle having steerable wheels, means operable for turning the steerable wheels of the towed vehicle in the opposite direction from the direction in which the steerable wheels of the towing vehicle are turned, control means for the first-named means providing four stations each capable of causing actuation of the first-named means, two of the stations being capable of causing actuation of the first-named means in a manner such as to urge the steerable wheels of the towed vehicle to turn in one direction and the remaining two of the stations being capable of causing actuation of the first-named means in a manner such as to urge the steerable wheels of the towed vehicle to turn in the opposite direction, means operable by misalignment of the vehicles in one direction for causing said two of the stations to be ineffective to cause actuation of the first-named means and operable by misalignment of the vehicles in the opposite direction for causing said remaining two of the stations to be effective to cause actuation of the first-named means, and means operable by shifting of the vehicles from forward to reverse for causing one station of said two of the stations and one station of the said remaining two of the stations to be ineffective to cause actuation of the first-named means and operable by shifting of the vehicles from reverse to forward for causing the other of said two of the stations and the other station of said remaining two of the stations to be ineffective to cause actuation of the first-named means.

20. A device of the class described adapted to be attached to a towed vehicle having steerable wheels and a towing vehicle comprising a lead screw, means attachable to the towed vehicle and supporting the lead screw for bodily pivotal movement about a point intermediate the ends of the lead screw and for axial rotation, means for connecting the lead screw to the steerable wheels of the towed vehicle to enable the lead screw to cause turning of the steerable wheels of the towed vehicle when the lead screw is turned, a nut on the lead screw adapted on axial rotation of the lead screw to be moved from one side of the pivot point of the lead screw to the other, means attachable to the vehicles and operable by misalignment of the vehicles to urge the lead screw to bodily turn, and means attachable to the vehicles and operable by shifting of the vehicles from forward to reverse or vice versa for causing a changeover of the nut from one side of the pivot point of the lead screw to the other.

21. A device of the class described adapted to be attached to a towed vehicle having steerable wheels and a towing vehicle comprising a lead screw, means attachable to the towed vehicle and supporting the lead screw for bodily pivotal movement about a point intermediate the ends of the lead screw and for axial rotation, means for connecting the lead screw to the steerable wheels of the towed vehicle to enable the lead screw to cause turning of the steerable wheels of the towed vehicle when the lead screw is turned, a nut on the lead screw adapted on axial rotation of the lead screw to be moved from one side of the pivot point of the lead screw to the other, means attachable to the vehicles and operable by misalignment of the vehicles to urge the lead screw to bodily turn, means attachable to the vehicles and operable by shifting of the vehicles from forward to reverse or vice versa for causing a changeover of the nut from one side of the pivot point of the lead screw to the end, and booster means operatively connected to the lead screw for urging the lead screw to bodily turn in the same direction in which the first-named means urges the lead screw to bodily turn.

22. A device of the class described adapted to be attached to a towed vehicle having steerable wheels and a towing vehicle comprising a lead screw, means attachable to the towed vehicle and supporting the lead screw for bodily pivotal movement about a point intermediate the ends of the lead screw and for axial rotation, means for connecting the lead screw to the steerable wheels of the towed vehicle to enable the lead screw to cause turning of the steerable wheels of the towed vehicle when the lead screw is turned, a nut on the lead screw adapted on axial rotation of the lead screw to be moved from one side of the pivot point of the lead screw to the other, means attachable to the vehicles and operable by misalignment of the vehicles to urge the lead screw to bodily turn, means attachable to the vehicles and operable by shifting of the vehicles from forward to reverse or vice versa for causing a changeover of the nut from one side of the pivot point of the lead screw to the end, and booster means operatively connected to the lead screw for urging the lead screw to bodily turn and being operatively connected to the first-named means and the nut to be controlled thereby so that the booster means operates to always urge the lead screw to bodily turn in the same direction in which the first-named means urges the lead screw to bodily turn.

OTTY JAMES SEELY.

REFERENCES CITED

The following references are of record in the file of this patent:

UNITED STATES PATENTS

| Number | Name | Date |
|---|---|---|
| 1,245,054 | Spencer | Oct. 30, 1917 |
| 1,849,260 | Williams | Mar. 15, 1932 |
| 2,018,197 | Vorech et al. | Oct. 22, 1935 |